(12) United States Patent
Tapson

(10) Patent No.: US 7,856,119 B2
(45) Date of Patent: Dec. 21, 2010

(54) EMBEDDING DATA IN MATERIAL

(75) Inventor: Daniel Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 157 days.

(21) Appl. No.: 11/966,189

(22) Filed: Dec. 28, 2007

(65) Prior Publication Data

US 2008/0166012 A1 Jul. 10, 2008

Related U.S. Application Data

(63) Continuation of application No. 10/006,298, filed on Dec. 6, 2001, now Pat. No. 7,343,024.

(30) Foreign Application Priority Data

Dec. 7, 2000 (GB) ................................ 0029863.8

(51) Int. Cl.
 *G06K 9/00* (2006.01)
(52) U.S. Cl. ...................... 382/100; 713/176
(58) Field of Classification Search .................. 382/100, 382/232; 380/54, 210, 252, 287; 713/176; 704/200.1, 273; 381/73.1; 348/460, 463
See application file for complete search history.

(56) References Cited

U.S. PATENT DOCUMENTS

| | | | | |
|---|---|---|---|---|
| 5,848,155 A | * | 12/1998 | Cox | ............................ 382/191 |
| 5,915,027 A | * | 6/1999 | Cox et al. | ...................... 380/54 |
| 5,930,369 A | | 7/1999 | Cox et al. | |
| 5,933,798 A | * | 8/1999 | Linnartz | ..................... 702/191 |
| 6,108,434 A | * | 8/2000 | Cox et al. | ................... 382/100 |
| 6,154,571 A | | 11/2000 | Cox et al. | |
| 6,208,735 B1 | * | 3/2001 | Cox et al. | ...................... 380/54 |
| 6,332,030 B1 | | 12/2001 | Manjunath et al. | |
| 6,674,876 B1 | | 1/2004 | Hannigan et al. | |
| 2002/0118859 A1 | * | 8/2002 | Stone et al. | ................. 382/100 |

FOREIGN PATENT DOCUMENTS

| | | |
|---|---|---|
| EP | 0 828 372 | 3/1998 |
| EP | 1 005 229 | 5/2000 |
| EP | 1 039 414 | 9/2000 |
| WO | WO 98/33325 | 7/1998 |

OTHER PUBLICATIONS

Raymond B. Wolfgang, et al., "The Effect of Matching Watermark and Compression Transforms in Compressed Color Images", IEEE, Oct. 1998, vol. 1, pp. 440-444.
W. N. Cheung, "Digital Image Watermarking in Spatial and Transform Domains", IEEE, 2000, vol. 3, pp. 374-378.

(Continued)

*Primary Examiner*—Anand Bhatnagar
(74) *Attorney, Agent, or Firm*—FOblon, Spivak, McClelland, Maier & Neustadt, L.L.P.

(57) ABSTRACT

An apparatus including a transformer for transforming transform domain data into time domain data and a combiner for receiving material and combining said time domain data with said material to form data embedded material. Hence, the material is not subject any transformation at all.

28 Claims, 4 Drawing Sheets

OTHER PUBLICATIONS

Te-shen Liang, et al., "A Modified Robust Embedding Scheme for Faithful Watermark Extraction", IEEE, 2000, vol. 1, pp. 419-422.

Te-shen Liang, et al., "Improved Watermark Robustness Via Spectrum Equalization", IEEE, 2000, vol. 6, pp. 1951-1954.

C. Valens, "A Really Friendly Guide to Wavelets", 1999 (c.valens@mindless.com).

SMPTE Journal, Proposed SMPTE Standard for Television—Unique Material Identifier (UMID), Mar. 2000, pp. 221-225.

Inspec Abstract Accession No. 6900341 "Digital Image Watermarkin in Spatial and Transform Domains" Cheung (Sep. 24-27, 2000).

Inspec Abstract Accession No. 6572137 "A New Watermarking Method Using High Frequency Components to Guide the Insertion Process in the Spatial Domain" Goirizelaia et al (Sep. 1-3, 1999).

Inspec Abstract Accession No. 6015527 "Robust Image Watermarking in the Spatial Domain" Nikolaidis et al (May 1998).

M. Caramma, et al., "A Blind & Readable Watermarking Technique for Color Images", IEEE, 2000, vol. 1, pp. 442-445.

* cited by examiner

Schematic of Wavelet Transform

EMBEDDING DATA IN MATERIAL

CROSS-REFERENCE TO RELATED APPLICATION

The present continuation Application claims the benefit of priority under 35 U.S.C. §120 to application Ser. No. 10/006,298, filed Dec. 6, 2001, and under 35 U.S.C. §119 from United Kingdom Application No. 0029863.8, filed on Dec. 7, 2000, the entire contents of both are hereby incorporated herein by reference.

BACKGROUND OF THE INVENTION

1. Field of the Invention

The present invention relates to embedding data in material. Embodiments of the present invention relate to watermarking.

Material as used herein means information material represented by information signals and material includes at least one or more of image material, audio material and data material. Image material is generic to still and moving images and includes video and other forms of information signals represents images.

2. Description of the Prior Art

Steganography is the embedding of data into material such as video material, audio material and data material in such a way that the data is imperceptible in the material.

Data may be embedded as a watermark in material such as video material, audio material and data material. A watermark may be imperceptible or perceptible in the material.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. Watermarks may be "fragile" in that they are easily damaged by processing which is useful to detect attempts to remove the mark or process the material.

Visible watermarks are useful to allow e.g. a customer to view an image e.g. over the Internet to determine whether they wish to buy it but without allowing the customer access to the unmarked image they would buy. The watermark degrades the image and the mark is preferably not removable by the customer. Visible watermarks are also used to determine the provenance of the material into which they are embedded.

FIG. 1 shows one such known apparatus, generally 100, for embedding a transform domain watermark in an image. The image 105 is received by the transformer 110 and output as a transform domain image 115. The transform domain watermark 145 is then applied to the transform domain image 115 by the combiner 120 which outputs a transform domain watermarked image 125. The transform domain watermarked image 125 is then received by the inverse transformer 130 and output as a spatial domain watermarked image 135.

However, a problem arises in that the image 105 may be degraded by the operation of both the transformer 110 and inverse transformer 130. The transformers 110, 130 need to be very accurate to ensure that any degradation is minimised. Accurate transformers are relatively expensive and two are required.

SUMMARY OF THE INVENTION

According to one aspect of the present invention there is provided an apparatus comprising a transformer for transforming transform domain data into spatial domain data; and a combiner for receiving material and combining said spatial domain data with said material to form data embedded material.

Hence, in preferred embodiments the material is not subject any transformation at all. One less transformer is required than the prior art approach thereby reducing cost and complexity. Advantageously, since only the transform domain watermark is transformed the transformer can have less precision and range thereby further reducing cost and complexity.

According to another aspect of the present invention there is provided a method comprising the steps of a) transforming transform domain data into spatial domain data; and b) combining said spatial domain data with material to form data embedded material.

According to a further aspect of the present invention there is provided a computer program product arranged to carry out the method of said another aspect when run on a computer.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF PREFERRED EMBODIMENTS

Whilst the embodiments described herein refer to images and watermarking images it will be appreciated that the technique can be equally be applied to other material such as audio, video and data generally.

Figure 1:
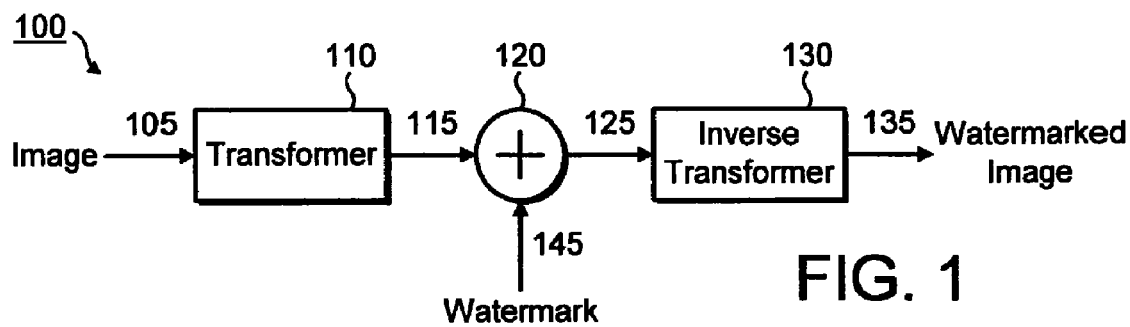
FIG. 1 is a block diagram illustrating a prior art watermarking apparatus.
Figure 2:
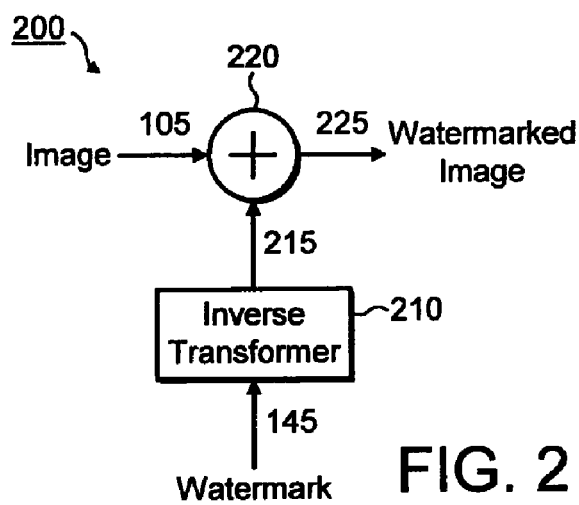
FIG. 2 is a block diagram illustrating a watermark apparatus according to an embodiment of the present invention.

FIG. 2 illustrates a watermark apparatus, generally 200, according to an embodiment of the present invention. The watermark apparatus 200 comprises an inverse transformer 210 and a combiner 220. In overview, the watermark apparatus 200 receives a spatial domain image 105 and a transform domain watermark 145, and outputs a spatial domain watermarked image 225. The transform domain watermark 145 is inverse transformed in a transformer 210 and combined with the spatial domain image 105 in a combiner 220 to produce the spatial domain watermarked image 225. Only the transform domain watermark 145, and not the spatial domain image 105, is subject to subject any transformation. The spatial domain image 105 is not subject to any lossy processing which may degrade the spatial domain image 105 and is fully recoverable.

Spatial Domain Image 105

The spatial domain image 105 is preferably a digital bitmap. The digital bitmap comprises of a plurality of pixels, each pixel having a particular binary value.

Transform Domain Watermark 145

The transform domain watermark 145 comprises encoded watermark information. The transform domain watermark 145 is preferably a digital bitmap. The digital bitmap comprises of a plurality of pixels, each pixel having a particular binary value, each particular binary value encoding the watermark information.

The transform domain watermark 145 may comprise wavelet coefficients, each coefficient being represented by one pixel of the digital bitmap. Wavelets are described in more detail below the section entitled wavelets. The value of each wavelet coefficient encodes the watermark information. The wavelet has watermark information which is encoded in coefficients in at least two bands in at least one level. In preferred embodiments, the upper horizontal band, $hH_1$, $hV_1$ and the upper vertical band, $1H_1$, $hV_1$ are used to encode the watermark information as watermark information encoded in these bands have been found not to be readily perceptible in the spatial representation. Furthermore, watermark information is encoded in these bands because it has been found to be robust to image compression techniques such as those agreed by the Joint Picture Expert Group (JPEG). However, it will be appreciated that the watermark information may be encoded in any suitable coefficients and any band or level as appropriate.

Alternatively, the transform domain watermark 145 may comprise Discrete Cosine Transform (DCT) coefficients, each coefficient being represented by one pixel of the digital bitmap. DCTs are well known in the art. Preferably, the value of each DCT coefficient encodes the watermark information.

The watermark information may, for example, identify the owner of the spatial domain image 105 or provide other information associated with the spatial domain image 105. Preferably, the watermark information comprises a Universal Material Identifier (UMID) associated with the spatial domain image 105. The use of a UMID is advantageous as it provides for unique identification of the spatial domain image 105. UMIDs are described in more detail below in the section entitled UMIDs. Preferably, the watermark information is encoded by a Pseudo Random Symbol Stream. The use of Pseudo Random Symbol Stream encoding is advantageous as it reduces the visual perceptibility of the watermark and makes it more difficult for the watermark information to be isolated or removed. The Pseudo Random Symbol Stream spreads the watermark over many coefficients. Encoding or 'spreading' using Pseudo Random Symbol Stream's is well known in the art. The watermark information may also be subject to en- or correction coding to improve decoding success rates.

Inverse Transformer 210

The inverse transformer 210 receives the transform domain watermark 145 and transforms transform domain watermark 145 into a spatial domain watermark 215. Where the transform domain watermark 145 comprises wavelet coefficients, the inverse transformer 210 comprises an inverse wavelet transformer. Where the transform domain watermark 145 comprises DCT coefficients, the inverse transformer 210 comprises an inverse DCT transformer. It will be appreciated that other techniques for transform domain representation may also be used and suitable inverse transformers will be required as appropriate. Since only the transform domain watermark 145, and not the spatial domain image 105, is to be transformed the inverse transformer 210 can have less precision and range thereby further reducing cost and complexity. Any losses introduced into the spatial domain watermark 215 by the inverse transformer 210 may be recovered using decoding techniques such as error correction coding.

The spatial domain watermark 215 is preferably a digital bitmap. The digital bitmap comprises of a plurality of pixels, each pixel having a particular value.

Combiner 220

The combiner 220 receives the spatial domain image 105 and the spatial domain watermark 215, and outputs a spatial domain watermarked image 225. The combiner 220 arithmetically combines respective pixels of the spatial domain image 105 and the spatial domain watermark 215 to produce the spatial domain watermarked image 225.

ALTERNATIVE EMBODIMENT

Figure 3:
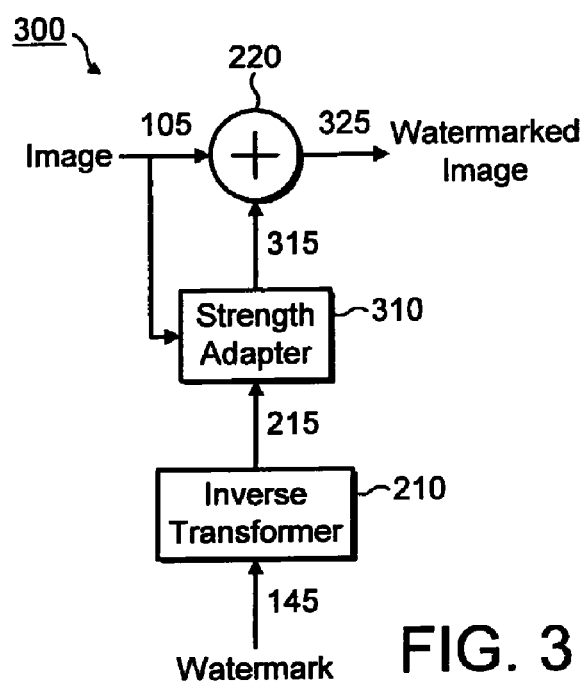
FIG. 3 is a block diagram illustrating a watermark apparatus according to another embodiment of the present invention.

FIG. 3 illustrates a watermark apparatus, generally 300, according to another embodiment of the present invention. The watermark apparatus 300 is similar to the arrangement of FIG. 2 but with the inclusion of a strength adapter 310. The strength adapter 310 adapts the strength of the spatial domain watermark 215 in dependence on the spatial domain image 105 to produce a strength adapted spatial domain watermark 315. The combiner 220 arithmetically combines respective values of the spatial domain image 105 and the strength adapted spatial domain watermark 315 to produce a spatial domain watermarked image 325.

The strength adapter 310 allows the strength of the watermark spatial domain watermark 215 to be adapted such that the strength adapted spatial domain watermark 315 is not readily perceptible in the spatial domain watermarked image 325. Each pixel of the spatial domain watermark 215 may be individually adapted in dependence on respective pixels of the spatial domain image 105. Alternatively, a predetermined number of pixels of the spatial domain watermark 215 may be adapted in dependence on particular representative pixels of the spatial domain image 105.

Figure 4:
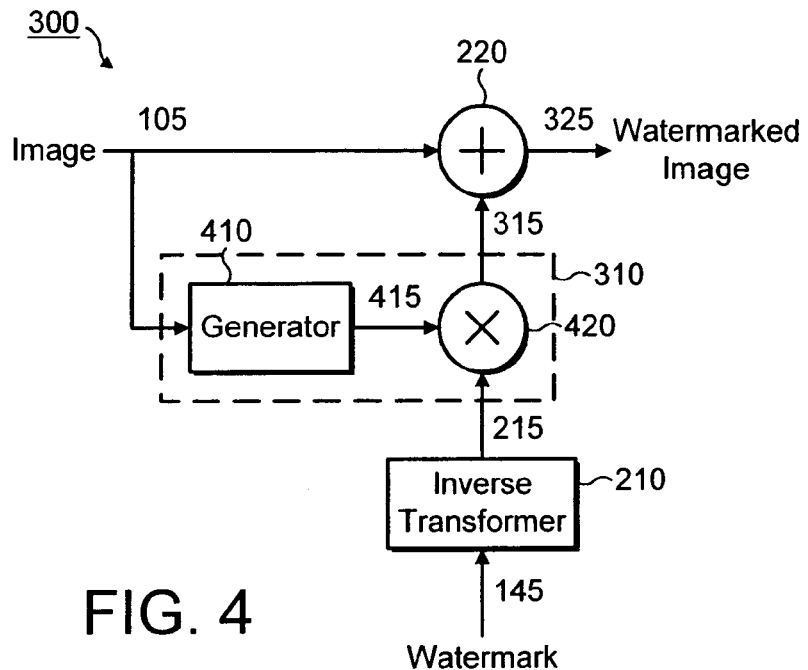
FIG. 4 is a block diagram illustrating an embodiment of the strength adapter of FIG. 3.

FIG. 4 illustrates an embodiment of the strength adapter of FIG. 3. The strength adapter 310 comprises a generator 410 and a multiplier 420. The generator 410 receives the spatial domain image 105 and generates strength control information 415. The strength control information 415 is received by the multiplier 420 which, in response, adapts the magnitude of the spatial domain watermark 215 to produce a strength adapted spatial domain watermark 315.

The generator 410 may generate strength control information 415 such that each pixel of the spatial domain watermark 215 may be individually adapted in dependence on respective pixels of the spatial domain image 105. Alternatively, the generator 410 may generate strength control information 415 such that a predetermined number of pixels of the spatial domain watermark 215 may be adapted in dependence on particular representative pixels of the image 105. The strength control information 415 ($\alpha$) is generated using the algorithm $\alpha=F(Image)$, where $F(Image)$ is a function representing the ability of the image 105 to mask respective pixels of the spatial domain watermark 215.

The strength adapted spatial domain watermark 315 is then combined by the combiner 220 with the image 105 to produce a spatial domain watermarked image 325 as described above.

FURTHER EMBODIMENT

Figure 5:
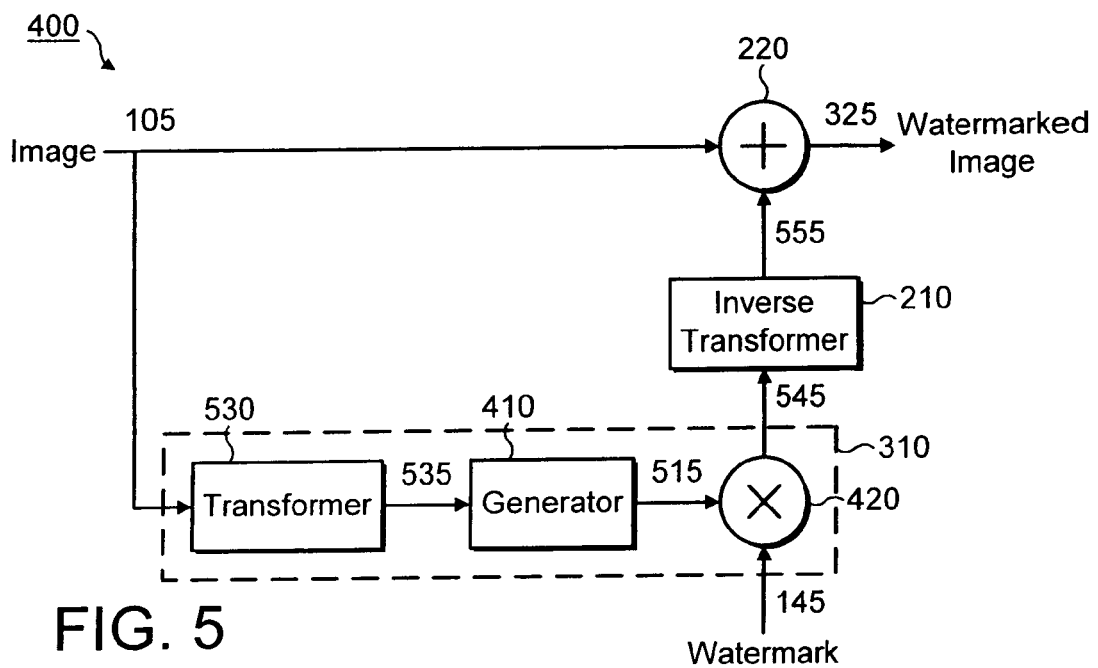
FIG. 5 is a block diagram illustrating a watermark apparatus according to a further embodiment of the present invention.

FIG. 5 illustrates a watermark apparatus, generally 400, according to a further embodiment of the present invention. The watermark apparatus 400 is similar to the arrangement of FIG. 4 but with the strength adaptation being performed in the transform domain instead of the spatial domain. Hence, a transformer 430 is provided which transforms the spatial domain image 105 into a transform domain image 535.

The generator 410 receives the transform domain image 535 and generates strength control information 515. The strength control information 515 is received by the multiplier 420 which, in response, adapts the magnitude of the transform domain watermark 145 to produce a strength adapted transform domain watermark 545.

The generator 410 may generate strength control information 515 such that each pixel of the transform domain watermark 145 may be individually adapted in dependence on respective pixels of the transform domain image 535. Alternatively, the generator 410 may generate strength control information 515 such that a predetermined number of pixels of the transform domain watermark 145 may be adapted in dependence on particular representative pixels of the transform domain image 535.

The inverse transformer 210 receives the strength adapted transform domain watermark 545 and transforms the strength adapted transform domain watermark 545 into a strength adapted spatial domain watermark 555.

The strength adapted spatial domain watermark 555 is then combined by the combiner 220 with the spatial domain image 105 to produce a spatial domain watermarked image 525 as described above.

Hence, it will be appreciated that only the transform domain watermark 145, and not the image 105, is subject to any transformation. Accordingly, the image 105 is not subject to any lossy processing and will be fully recoverable.

UMIDs

Figure 6A:
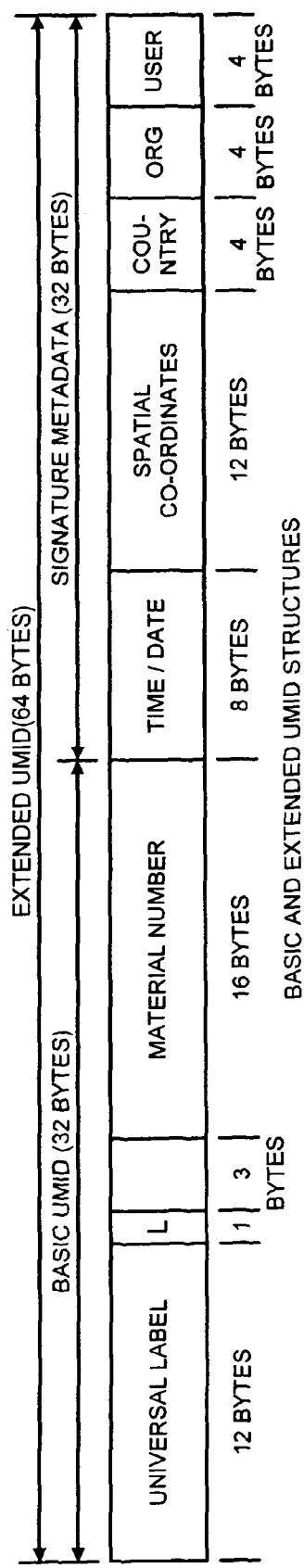
FIGS. 6A and 6B illustrate a UMW structure.
Figure 6B:
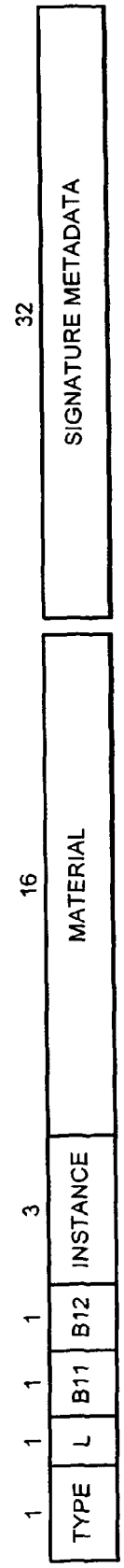

FIGS. 6A and 6B illustrate a UMID structure.

The UMID is described in SMPTE Journal March 2000. Referring to FIG. 6A an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-byte Universal Label

The first 12 bytes of the UMID provide identification of the UMID by the registered string value defined in Table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in Table 1 may be changed: the values given are examples. Also the bytes 1-12 may have designations other than those shown by way of example in the table. Referring to the Table 1, in the example shown byte 4 indicates that bytes 5-12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed preassigned values. Byte 11 is variable. Thus referring to FIG. 6B, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33W for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance, number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17 Nov. 1858 and allows dates to the year 4597.

The Spatial Co-Ordinate Format

The spatial co-ordinate value consists of three components defined as follows:

Altitude: 8 decimal numbers specifying up to 99,999,999 meters.

Longitude: 8 decimal numbers specifying East/West 180.00000 degrees (5 decimal places active).

Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Wavelets

Figure 7A:
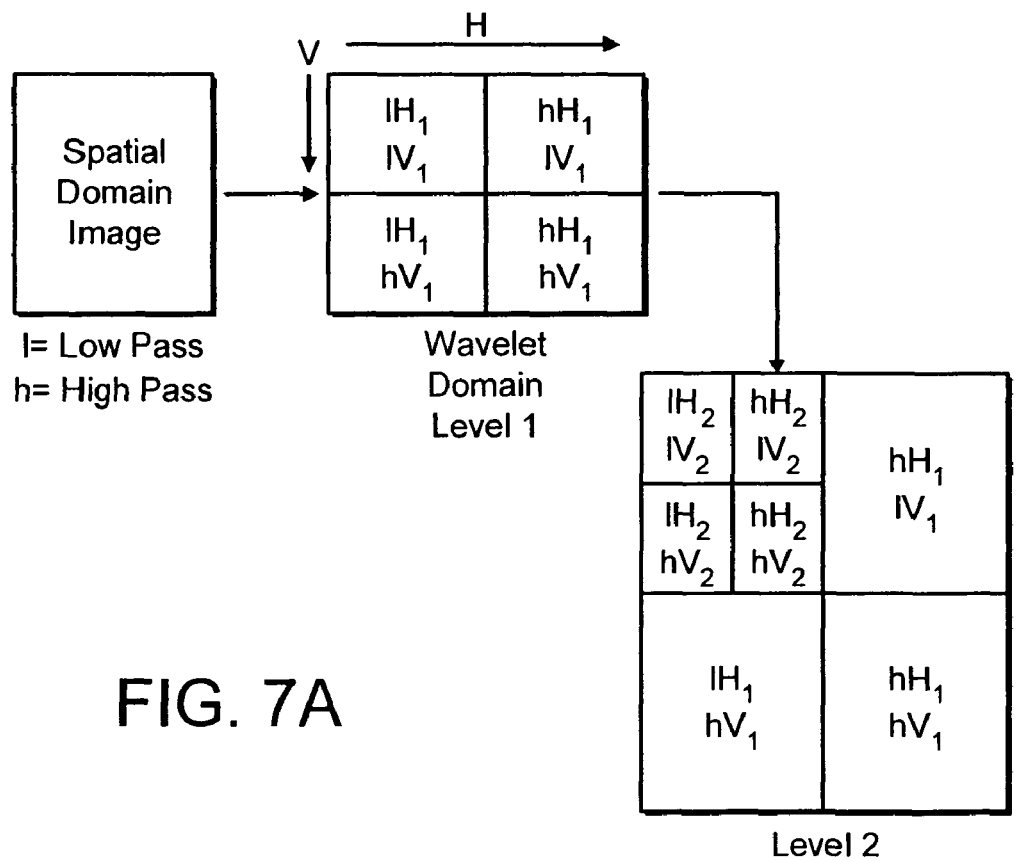
FIGS. 7A and 7B illustrate wavelet processing and notation.
Figure 7B:
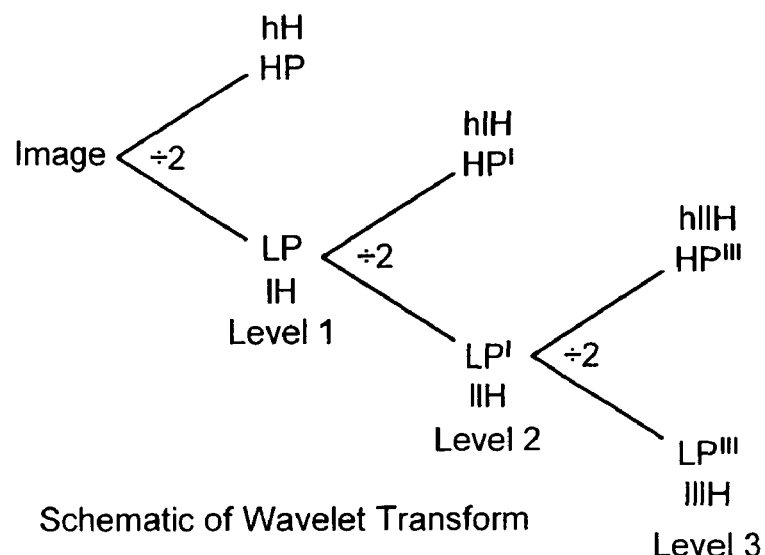

FIGS. 7A and 7B illustrate wavelet processing and notation. Wavelets are well known and are described in for example "A Really Friendly Guide to Wavelets" by C Valens, 1999 (c.valensOlmindless.com) and available at http://perso.wanadoo.fr/polyvalens/clemens/wavelets/wavelets.html.

Valens shows that the discrete wavelet transform can be implemented as an iterated filter bank as used in sub-band coding, with scaling of the image by a factor of 2 at each iteration.

Thus referring to FIG. 7B, a spatial domain image is applied to a set of high pass HP and low pass LP filters. At level 1, the first stage of filtering, the image is filtered horizontally and vertically and, in each direction, scaled down by a factor of 2. In level 2, the low pass image from level 1 is filtered and scaled in the same way as in level 1. The filtering and scaling may be repeated in subsequent levels 3 onwards.

The result is shown schematically in FIG. 7A. FIG. 7A is a representation normal in the art. The horizontal axis indicates increasing horizontal frequencies and the vertical axis indicates increasing vertical frequencies. At level one the image is spatially filtered into four bands: the lower horizontal and vertical band, $1H_1$, $1V_1$; the upper horizontal band $hH_1$, $1V_1$; the upper vertical band $1H_1$, $hV_1$; and the upper horizontal and vertical band, $hH_1$, $hV_1$. At level 2, the lower horizontal and vertical band, $1H_1$, $1V_1$ is filtered and scaled into the lower horizontal and vertical band, $1H_2$, $1V_2$; the upper horizontal band $hH_2$, $1V_2$; the upper vertical band $1H_2$, $hV_2$; and the upper horizontal and vertical band, $hH_2$, $hV_2$. At level 3 (not shown in FIG. 7A), the lower horizontal and vertical band, $1H_2$, $1V_2$ is further filtered and scaled.

In so far as the embodiments of the invention described above are implemented, at least in part, using software-controlled data processing apparatus, it will be appreciated that a computer program providing such software control and a storage medium by which such a computer program is stored are envisaged as aspects of the present invention.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus comprising:
   an inverse transformer configured to perform an inverse transformation of watermark data from a transform domain into watermark data in a time domain, wherein said transform domain is a domain other than the time domain, the transform domain watermark data comprising a plurality of transform domain coefficients and the time domain watermark data comprising a plurality of time domain samples which represent the watermark data in the time domain; and
   a combiner configured to receive material into which no watermark data has been embedded, the material being in the time domain, the material comprising a plurality of time domain samples, and to combine the samples of said time domain watermark data with the time domain samples of said material in the time domain to form watermark data embedded material.

2. The apparatus of claim 1, wherein said inverse transformer is configured to receive said transform domain watermark data comprising a plurality of transform domain coefficients and to transform said transform domain watermark data into time domain data comprising a plurality of time domain samples which form the time domain watermark data.

3. The apparatus of claim 2, wherein said material is one or more of audio/visual material and audio material.

4. The apparatus of claim 2, wherein said material is data material.

5. The apparatus of claim 3, wherein said combiner arithmetically combines the samples of said material and the samples of said time domain watermark data.

6. The apparatus of claim 1, wherein said transform domain watermark data comprises a Pseudo Random Symbol Stream modulated by information to embed in the material.

7. The apparatus of claim 1, wherein said transform domain watermark data comprises a Universal Material Identifier (UMID).

8. The apparatus of claim 1, wherein said material and said time domain watermark data both comprise a digital audio streams.

9. The apparatus of claim 1, wherein said transform domain watermark data comprises a digital audio streams.

10. The apparatus of claim 1, wherein said transform domain watermark data comprises wavelet coefficients and said inverse transformer is an inverse wavelet transformer.

11. The apparatus of claim 10, wherein said wavelet coefficients comprise information encoded in coefficients in at least two bands in at least one level.

12. The apparatus of claim 1, wherein said transform domain watermark data comprises DCT coefficients and said inverse transformer is an inverse DCT transformer.

13. The apparatus of claim 1, further comprising:
a strength adapter configured to adapt the strength of the samples of said time domain watermark data in dependence on the time domain samples of said material,
wherein said combiner is configured to arithmetically combine the time domain samples of said material and said strength adapted samples of the time domain watermark data.

14. The apparatus of claim 13, wherein said strength adapter comprises:
a generator responsive to the samples of said material and configured to generate strength control information; and
a multiplier configured to adapt the magnitude of the samples of said time domain watermark data in accordance with said strength control information to produce said strength adapted time domain watermark data.

15. The apparatus of claim 14, wherein said material comprises time domain material and said generator is configured to generate strength control information responsive to said time domain material.

16. The apparatus of claim 14, wherein said generator is configured to receive the time domain samples of said material, to analyze each value of said material and to generate strength control information.

17. The apparatus of claim 16, comprising:
a strength coefficient adapter configured to adapt the strength of the coefficients of said transform domain watermark data in dependence on the time domain samples of said material,
wherein said inverse transformer is configured to transform said strength adapted transform domain watermark data into strength adapted time domain watermark data and said combiner is configured to arithmetically combine the samples of said material and said strength adapted samples of the time domain watermark data.

18. The apparatus of claim 17, wherein said strength coefficient adapter comprises:
a transformer configured to transform the time domain samples of said material into transform domain material comprising a plurality of transform domain coefficients;
a strength generator responsive to the coefficients of said transform domain material and configured to generate strength control information; and
a multiplier configured to adapt the magnitude of the coefficients of said transform domain watermark data in accordance with said strength control information to produce strength adapted transform domain data comprising a plurality of transform domain coefficients.

19. The apparatus of claim 18, wherein said strength generator is configured to receive said transform domain material, to analyze each sample of said transform domain material and to generate strength control information.

20. The apparatus of claim 1, wherein said transform domain watermark data comprises wavelet transform coefficients and said inverse transformer is an inverse wavelet transformer.

21. A non-transitory computer readable storage medium encoded with instructions, which when executed by a computer causes the computer to implement a method comprising the steps of:
inverse transforming watermark data from a transform domain into watermark data in the time domain, wherein said transform domain is other than the time domain, the transform domain watermark data comprising a plurality of transform domain coefficients and the time domain watermark data comprising a plurality of time domain samples which represent the watermark data in the time domain;
receiving material into which no watermark data has been embedded, the material being in the time domain, and the material comprising a plurality of time domain samples; and
combining the samples of said time domain watermark data with the time domain samples of material to form watermark data embedded material.

22. The non-transitory computer readable storage medium of claim 21, wherein prior to the inverse transforming step, the method includes performing the step of:
receiving the transform domain watermark data.

23. The non-transitory computer readable storage medium of claim 21, wherein the combining step comprises the step of:
arithmetically combining the samples of said time domain watermark data and the time domain samples of said material.

24. The non-transitory computer readable storage medium of claim 23, wherein the method further comprises the step of:
adapting the strength of the samples of said time domain watermark data in dependence on the time domain samples of said material and outputting strength adapted time domain watermark data, and
wherein the combining step comprises the step of arithmetically combining the samples of said strength adapted time domain watermark data and the time domain samples of said material.

25. The non-transitory computer readable storage medium of claim 24, wherein the adapting step comprises the steps of:
generating strength control information; and
adapting the magnitude of the samples of said time domain watermark data in accordance with said strength control information.

26. The non-transitory computer readable storage medium of claim 25, wherein the generating strength control information step comprises the steps of:
receiving the time domain samples of said material; and
analyzing each sample of said material.

27. The non-transitory computer readable storage medium of claim 21, wherein the said material is audio/video material or audio material.

28. The non-transitory computer readable storage medium of claim 21, wherein the said material is data material.

* * * * *